Patented Apr. 12, 1949

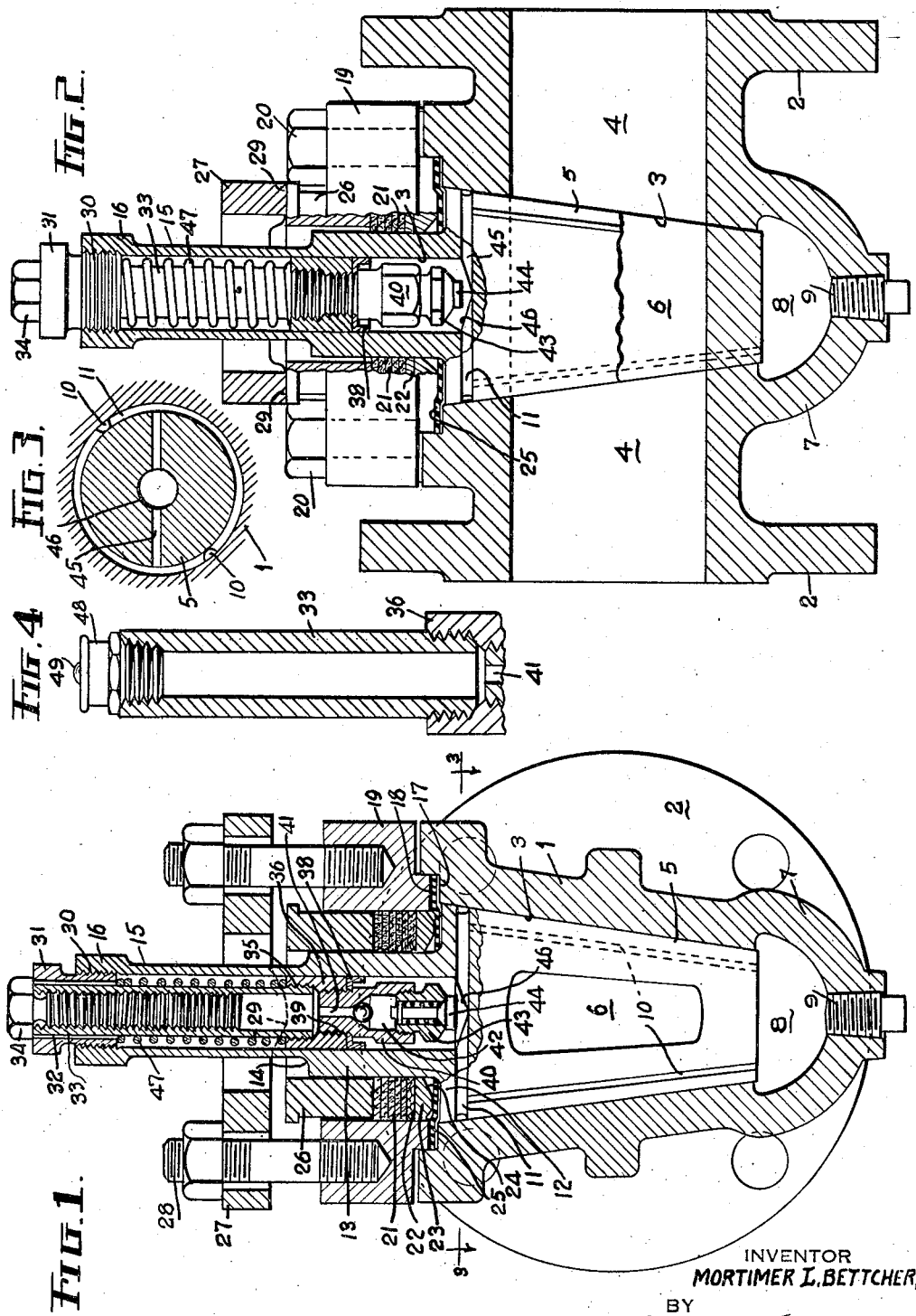

2,466,790

UNITED STATES PATENT OFFICE 2,466,790

PLUG VALVE

Mortimer L. Bettcher, Dayton, Ohio, assignor to The Duriron Company, Inc., Dayton, Ohio, a corporation of New York Application June 24, 1944, Serial No. 541,874

1 Claim. (Cl. 251—93)

The present invention relates to valves for controlling the flow of fluids and more particularly to valves of the plug cock type.

It is customary in valves of this character to employ a lubricating system by which the lubricant is applied to the bearing surfaces at the valve seat. The lubricant is usually contained in a reservoir and is subjected to pressure by a set screw or other suitable device to force the lubricant through passageways that are provided in the plug and/or in the coupling body at the position of the valve seat. These passageways usually take the form of grooves which extend diametrally around the plug and inter-connect with grooves that extend longitudinally of the plug and terminate in the lubricant reservoir.

This method of lubricating a plug cock valve is in general satisfactory but it has been found on occasion that the pressure normally applied to the lubricant by the set screw does not serve continually to keep the grooves or passageways filled with grease. In order to solve this problem the art has devised a piston and chamber arrangement in which the piston is urged against the spring when lubricant in the chamber is under pressure and as the lubricant is used, the spring urged piston maintains a continuous pressure on the lubricant. An improved structure for continually applying pressure to the lubricant is disclosed and claimed in the co-pending Jacobsen application Ser. No. 511,519, filed November 24, 1943, to the same assignee as the present case. In that application, a structure is shown in which pressure is applied to the lubricant at a position remote from the spring pressed plunger and the pressure chamber containing the plunger is filled with lubricant by operating the set screw after the lubricant has passed upwardly through the grooves of the plug. In other words, the set screw causes lubricant to be introduced at the small end of the plug into the plug grooves and forced upwardly along the tapered seat to eventually fill the piston-containing chamber. Such a structure has certain advantages and disadvantages. One outstanding advantage is the fact that the screw pressure-producing device is removed from the upper end of the valve, thus tending to lessen the complication of apparatus at that end, but it has the disadvantage in that it forces the lubricant that had been in use and perhaps diluted into the piston-containing chamber from whence it is again supplied to the valve seat with perhaps lessened lubricating effect.

Another disadvantage is that should any dirt or contamination collect in the plug grooves the lubricant forced therethrough under pressure and into the piston chamber may carry with it deleterious foreign matter and the latter is thus resupplied to the valve seat as the piston re-distributes the lubricant during operation.

The primary object of the invention is to provide an improved valve structure, particularly in regard to the lubricating system by which lubricant is introduced directly into the piston-containing chamber without forcing the introduced lubricant to flow through the plug grooves.

Another object is to provide a structure for the purpose set forth and including a lubricant introducing device so positioned with respect to the valve as to eliminate any complication of design or manufacture.

A still further object is to provide the lubricant introducing accessory and the pressure producing plunger device as a unitary structure so that the structure may be readily withdrawn from the apparatus for inspection, replacement and adjustment.

The above objects are attained in brief by extending the plug stem and providing an opening therein for receiving as a unitary screw device an accessory which performs the functions of introducing the lubricant and also of providing a storing chamber and a spring pressed plunger therein for maintaining a continuous pressure on the introduced lubricant.

The invention will be better understood when reference is made to the following description considered in connection with the accompanying drawings in which:

Figure 1 represents a vertical section of a typical plug valve provided with the improved lubricant accessory.

Figure 2 is also a vertical section of the valve but taken from a position 90° removed from the view shown in Figure 1. In Figures 1 and 2 certain parts are shown in elevation for clearness.

Figure 3 is a transverse sectional view taken along line 3—3 in Figure 1 and looking in the direction of the arrows.

Figure 4 shows a modified structure suitable for the introduction of lubricant by a grease gun.

Referring more particularly to Figure 1 reference character I designates the side wall of the main valve casting which terminates at each end in a coupling flange 2 which may be secured in any suitable manner to the separated ends of a pair of conduits through which the liquid to be controlled passes. The valve casting I is provided with a conically shaped opening 3 which extends at right angles to the main openings 4 and is adapted to rotatably receive the plug portion 5 of the valve. The plug is provided with a transversely extending opening, the arrangement being such that when this opening is in line with the openings 4 in the conduits, the valve is in open position.

The casting 1 is provided with a lower extension 7 hollowed out as indicated at 8 directly below the plug 5 in order to catch the lubricant as it passes downwardly along the conical valve seat. A pipe plug 9 may be provided in the extension 7 in order to permit flushing of the chamber 8.

The plug 5 is provided with a pair of longitudinally extending grooves 10, at least one of which communicates with the compartment 8. In addition, there may be provided a circumferential groove 11 at the top of the plug which serves to inter-connect the longitudinal grooves 10.

The upper end of the plug is provided with a shoulder 12 to leave a turned-down portion 13 which serves as the stem the latter in turn is shouldered as indicated at 14 down to a smaller hollow rod-like portion 15. The latter may terminate in a head 16 which is flattened if desired for receiving a wrench by which the plug is turned through 90° first in one direction and then in the other in order to open and close the valve.

The upper end of the casting 1 is provided with a countersunk recess 17 for receiving a shouldered portion 18 on a cover plate 19. The latter may be secured to the casting 1 in any suitable manner, for example by bolts 20 as indicated in Figure 2. The cover plate is provided with a round opening at the center considerably larger than the stem portion 13 in order to leave an annular space for receiving a plurality of layers of packing 21. This packing rests preferably on a packing washer 22 which in turn is supported by a metal ring 23. This ring is chamfered at its edges as indicated at 24 and presses against a gasket ring 25 which extends over the shoulder 12 of the plug and the countersunk recess 17. A gland ring 26 is also positioned within the said annular space for applying pressure to the packing material 21. This pressure is obtained from a gland plate 27 bolted as indicated at 28 to the cover plate 19 and provided with a pair of oppositely disposed arcuately spaced projections 29 which bear against the top surface of the gland ring 26. Thus by tightening the bolts 28 the ring 26 is forced against the packing material 21 so as completely to close off the annular space from any leakage of fluid upwardly along the plug stem.

The head 16 is threaded as indicated at 30 to receive a bushing 31 having a central bore 32. This bore slidably receives a metal rod 33 having an axially disposed threaded bore for engaging the threads of a cap screw 34. The lower end of the rod 33 is threaded as indicated at 35 in order to secure thereto a piston sleeve 36 which is adapted snugly but slidably to move through the opening 37 provided in the stem 13 and the rod portion 15. A cup shaped gasket 38 is secured to the lower surface of the sleeve 36. The lower portion of the sleeve 36 is provided with a threaded bore 39 smaller than the opening 35 and for receiving the threaded end of a hollow plug 40. This plug has a central opening 41 which leads to a larger opening 42 which is closed at the lower end by a fitting 43 containing a spring-retained plunger 44. The arrangement is such that when the lubricant under pressure is introduced into the opening 42 in a manner which will be described hereinafter the plunger 44 is normally forced downwardly against its spring to uncover the opening in the fitting 43. Immediately above the plunger 44, there is a ball check valve which operates in the same direction as the plunger. This ball check backs up the plunger check valve in that if the spring behind the plunger valve should break or if for any other reason the plunger 44 should permanently drop, the ball check would immediately and automatically function to prevent lubricant within the reservoir below the piston 38 from flowing upwardly into the space below the cap screw 34.

There is a diametrally disposed opening 45 provided through the plug at about the position of the circumferential groove 11 and this opening communicates with a countersunk depression 46 forming a continuation of the opening in the stem portions 13 and 15. Thus, when the plunger 44 is forced downwardly due to the pressure on the lubricant in the chamber 42, lubricating material is forced into countersunk opening 46 and then upwardly around the fitting 43 and the plug 40. This material is also forced into the radial openings 45 and into the channels 10.

The sleeve 36 is maintained in its downward position by means of a compression spring 47 surrounding the central rod 33 and bearing against the lower surface of the bushing 31. Thus, as lubricant under pressure is forced upwardly about the fitting 40, the piston sleeve 36 and its gasket 39 are pressed upwardly against the spring 47 and carrying with it the hollow rod 32 together with the cap screw 34. The head of the cap screw thus in effect is elevated above the bushing 31 and the height to which the cap screw is elevated serves as an indicator for the amount and pressure of the lubricant which is contained within the chamber directly below the gasket 38. It is apparent that the pressure of the lubricant within the chamber just below the gasket is obtained by tightening the cap screw 34 which serves to exert pressure on any lubricant placed within the cavity immediately below the shank of the cap screw. This valve stem is adapted to receive lubricant or grease in cartridge form and as the cap screw 34 is tightened, this lubricant is forced through the central opening 41 and through the spring pressed plunger in the fitting 43 into the space beyond. It is also apparent that as the cap screw is tightened, not only is the space about the fitting filled with lubricant, but a portion of the lubricant spewed out at the plunger 44 passes through the radial opening 45 through the longitudinally extending passageways 10 to the chamber 8, eventually filling this chamber. Some of the lubricant continues to move downwardly through the grooves 10 into the compartment 8. In practice, the latter is usually filled with lubricant before the plug 5 is placed in position so that when the cap screw 34 is turned to apply pressure to the lubricant in the chamber directly below the screw, practically all of the lubricant which flows past the piston 44 will enter the chamber directly below the sleeve-like piston 36 and very little will reach the compartment 8 as this compartment is already filled with lubricant.

It is apparent that as the lubricant in the grooves 10 and 11 is used up, fresh material is supplied to these grooves due to the pressing effect of the sleeve 36 on the material directly below the sleeve. It will also be apparent that the movement of the lubricant out of the piston-containing chamber into the grooves 10 and 11 is always in one direction—there is no reversal of direction. Consequently, none of the old lubricant that might have remained in the grooves 10 and 11 and which obviously could have been contaminated through seepage along the valve seat, ever reaches the piston-containing compartment in the stem 15 and therefore is never re-supplied to the lubricating grooves. The action of the fresh lubricant as it leaves the pressure chamber is to force any old or stale lubricant out of the grooves 10 and 11 into the compartment 8 which can be cleaned out from time to time by removing the screw plug 9.

In addition to the advantages in the operation discussed above, the improved structure lends itself to ease in manufacture because all of the internal parts within the stem 15 can be moved as a body for inspection of replacement by simply unscrewing the bushing 31. This arrangement also offers corresponding advantages in assembly.

Figure 4 shows a modified structure in which corresponding parts have been given the same reference characters. Instead of providing a cap screw 34 with a threaded shank for initially applying pressure to the lubricant, I may if desired employ a fitting 48 which is threadedly received by the hollow rod 33. This fitting has a spring-urged check valve 49 which when depressed by the nozzle of the grease gun, allows lubricant under pressure to be forced into the interior of the rod 33 and thence past the plunger 44, then outwardly and upwardly into the chamber which contains the spring-pressed plunger 36.

From the foregoing it is evident that I have disclosed an improved valve structure in which the plug is provided with an upstanding hollow stem for rotating the plug and the entire structure by which the lubricant can be admitted to the grooves 10 and 11 and also continuously maintained under pressure in order to replenish used up lubricant, is contained within the plug stem. The lubricant material passes through the grooves 10 and 11 in only one direction, namely downwardly, finally reaching compartment 8 which may be flushed from time to time by removing the screw 9. None of the stale lubricant remaining in the grooves 10 and 11 ever reaches the piston-containing compartment so that fresh lubricant is always assured of being supplied to the various plug grooves. By positioning the lubricant injection device and the structure for applying a continuous pressure to the lubricant both within the plug stem, certain economies of manufacture, assembly and maintenance are effected.

It will be understood that I desire to comprehend within my invention such modifications as come within the scope of the claim and the invention.

Having thus described my invention, what I claim as new and desire to secure by Letters Patent, is:

In combination, a valve body for controlling the flow of fluid, said body being provided with a main passageway and an angularly positioned bore connected therewith, a plug within said bore adapted to rotate, means for lubricating the seat between said plug and the bore, said means including a hollow stem secured to the plug and having affixed to the upper end an internal sleeve member, a tubular element adapted to slide within said sleeve member and having an externally threaded lower end, a piston sleeve having internal threads and threadedly engaging the said lower end of the tubular element, a spring engaging the sleeve member and piston sleeve for urging said piston sleeve downwardly, a hollow plug threadedly engaging the internal threads of said piston sleeve and having a restricted passage and a seat for a ball valve, a ball valve engaging said seat, a gasket forming with said piston sleeve a piston, said gasket being clamped between said piston sleeve and said hollow plug, said plug having an opening providing a space for movement of said ball valve terminating in a screw threaded lower end, means for closing said lower end comprising a fitting engaging said screw threaded lower end of said plug, said fitting having a passageway, a spring pressed plunger valve mounted in said passageway, and having a head seating upwardly to close the lower end of said last named passageway.

MORTIMER L. BETTCHER.

REFERENCES CITED

The following references are of record in the file of this patent:

UNITED STATES PATENTS

| Number | Name | Date |
|---|---|---|
| 1,932,322 | Nordstrom | Oct. 24, 1933 |
| 2,281,697 | Kerr | May 5, 1942 |

FOREIGN PATENTS

| Number | Country | Date |
|---|---|---|
| 330,044 | Great Britain | June 5, 1930 |